United States Patent
Velinde

[15] 3,703,839
[45] Nov. 28, 1972

[54] VARIABLE-THROW CRANKPIN CRANKSHAFT

[72] Inventor: Auguste Velinde, Wicres, France

[73] Assignee: Verlinde S. A., Loos, France

[22] Filed: Feb. 9, 1971

[21] Appl. No.: 113,847

[30] Foreign Application Priority Data
Jan. 21, 1970 France.....................7002073

[52] U.S. Cl...................74/600, 123/48 B, 123/78 F
[51] Int. Cl..............................................F16c 3/28
[58] Field of Search.................74/600, 571 L, 571 R; 123/48 B, 78 F; 417/219, 221

[56] References Cited

UNITED STATES PATENTS

| | | | |
|---|---|---|---|
| 1,189,588 | 7/1916 | Lander | 74/571 L |
| 1,907,647 | 5/1933 | Gruman | 74/571 L |
| 2,215,488 | 9/1940 | Svenson | 74/600 |

Primary Examiner—William F. O'Dea
Assistant Examiner—F. D. Shoemaker
Attorney—Robert E. Burns

[57] ABSTRACT

A crankshaft the crankpin consisting of a ring which has a throw variable from zero to several millimeters, and can transmit a relatively high torque value and withstand considerable stress applied at variable angles without buckling while permitting any desired adjustment of the crankpin throw during the crankshaft operation. The crankshaft comprises to this end a two-section hollow shaft with an intermediate rod engaging the bores of the shaft sections and, between these sections, a crankpin forming ring having a longitudinal cavity of elongated cross-sectional configuration and a width at least equal to the rod diameter and a major dimension at least equal to this diameter ; a diametral pin is locked to this ring by an outer sleeve which pin engages an oblique port formed in the rod whereby a change in the throw of the crankpin-forming ring is obtained by causing an axial movement of the rod.

6 Claims, 2 Drawing Figures

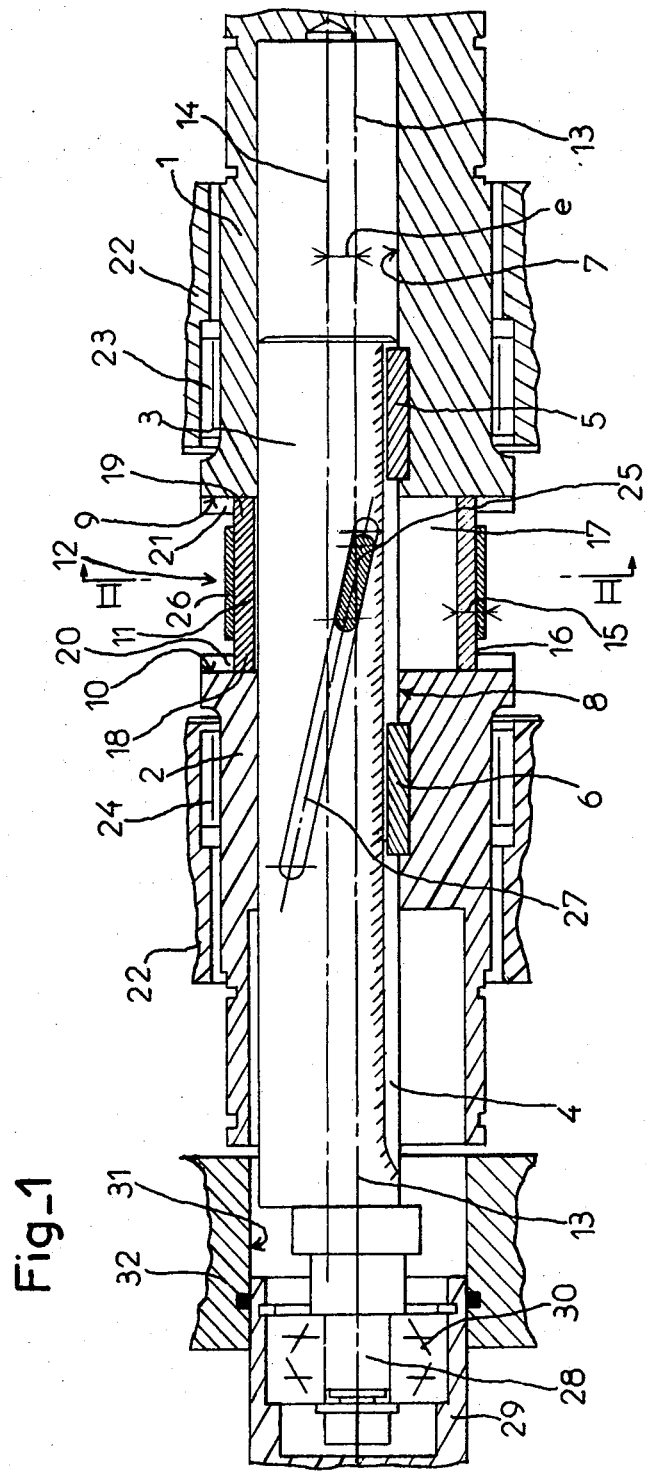
Fig_1

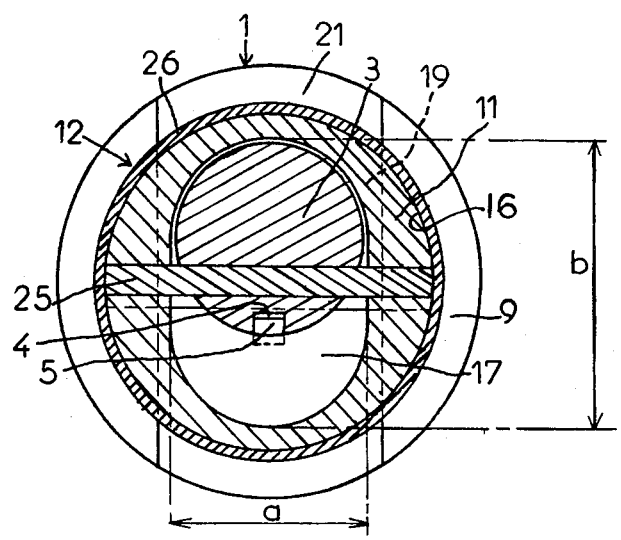
Fig_2

VARIABLE-THROW CRANKPIN CRANKSHAFT

BACKGROUND OF THE INVENTION

The present invention relates in general to crankshafts and has specific reference to a crankshaft structure having a variable-throw crankpin which is intended notably but not exclusively for use in machines to be operated as pumps and/or motors.

Rotary machines of this type are already known wherein the pistons are reciprocated by connecting-rods converting the rotary motion of a crankshaft into a motion of translation of the pistons; however, the throw or radial eccentricity of the crankpins of this crankshaft cannot be modified and under these conditions, typically when the machine is operated as a pump, it is not possible to obtain a desirable variable-output characteristic.

To overcome this inconvenience it is also known to use a crankshaft of which the crankpins have a variable throw obtained by the relative sliding engagement between the crankpins and corresponding inclined ramps or cam faces. In this respect the following documents may be referred to:

Belgian Pat. No. 424,844 describing a variable-speed device utilizing a cam formed with a parallel-faced slot fitting on the prismatic faces of a hollow power shaft constituting a "cage" in which a rod is slidably mounted which is also fitted in the cam slot of which at least one face comprises a stud engaging an inclined slot formed in said rod. Unfortunately, the hollow shaft grooved to permit the passage of said cam is thus weakened considerably and on the other hand as the torque is transmitted through the prismatic faces any sliding movement under load is definitely precluded. Besides, this device is particularly difficult to manufacture (notably with respect to the slot fitting operations).

French Pat. No. 461,558 also describes a variable-speed device of the same type as hereinabove with the same inconveniences : weakness of the power-shaft forming cage, impossibility of producing the under-load sliding movement of the rod causing the cam movement through the sliding engagement of a pin with an inclined port, and likewise complicated manufacture.

British Pat. No. 111,316 describing a device for controlling the sliding movement of a rod within a hollow shaft transmitting, through a radial groove, the rotary motion to one of the edges of a crankpin the eccentric position of which is obtained by translation of said rod comprising to this end a stud coacting with a groove machined inside the crankpin. In addition to the same inconveniences as those cited in the preceding two patents this construction is objectionable due to a "-buckling" of the crankpin as a consequence of the driving thereof through only one of its edges with the further drawback of applying shearing stress to the stud. Besides, with this mounting it is not possible to reduce the eccentricity or throw to zero value.

U.S. Pat. No. 3,106,105 describes a variable-throw crankpin wherein the eccentricity is modified by causing the flat-faced power shaft to slide in a radial groove formed in the crankpin, said power shaft further comprising an inclined tenon engaging a recess formed in said crankpin. With this device the flat-faced power shaft tends to warp and interferes with the sliding movement.

French Pat. No. 1,425,490 teaches means for rotatably driving a crankpin by means of radial grooves machined in the two flat faces of this crankpin, which is of relative variable throw. However, the radial grooves extend at right angles to each other and permit the throw variation only by the relative shifting of lateral control plates. In fact, this structure consists essentially of a specific application of the well-known Oldham joint or coupling.

French Pat. No. 473,835 discloses a crankpin device having an eccentricity variable in relation to a power shaft on which a ring having a cylindrical lateral surface and an oblique axis is adapted to slide in relation to the power shaft, said ring engaging a bore formed also obliquely in the crankpin. A pin extending freely through an axial hole of said ring provides the rotational coupling between the power shaft and the crankpin. Objectionable features of this structure are notably on the one hand the very limited torque applicable to this device through said pin and on the other hand the relatively high production cost due notably to the machining of an oblique bore.

SUMMARY OF THE INVENTION

It is the essential object of the present invention to provide a crankshaft wherein the crankpin has a throw or eccentricity variable from zero to several millimeters and adapted to transmit relatively high torque values and to withstand considerable stress applied at variable angles without developing any tendency of the crankpin to buckle while permitting the control of the crankpin throw during the crankshaft operation.

The crankshaft of the type specified hereinabove is characterized in that it comprises a power shaft divided into two coaxially aligned sections having two bores eccentric in relation to the axis of rotation of the power shaft, respectively, a rod engaged in said bores, means for rotatably connecting said rod to said shaft sections while permitting its axial sliding movement in said bores, a ring disposed between the registering end faces of said shaft sections, said rod extending through said ring formed on the other hand with an internal cavity having transverse dimensions greater than the diameter of said rod to permit a radial movement of said ring in relation to said rod and a diametral pin rigid with said ring and extending through a port formed in said rod, said port being inclined to the rod axis, said ring constituting the crankpin of the crankshaft, of which the eccentricity can be varied by axially moving said rod.

BRIEF DESCRIPTION OF THE DRAWINGS

The invention will be better understood from the following description taken in conjunction with the attached drawings illustrating diagrammatically by way of example a typical form of embodiment of variable-throw crankpin crankshaft according to this invention. In the drawings :

FIG. 1 is a longitudinal axial section of the crankshaft with the crankpin in its zero-throw position, and, FIG. 2 is a cross-section taken on a larger scale along the line II—II of FIG. 1.

DESCRIPTION OF THE PREFERRED EMBODIMENT

Referring to the drawings, the crankshaft illustrated therein comprises a power shaft divided into two hollow sections 1, 2 rotatably interconnected by an internal rod 3 having formed therein a longitudinal groove 4 adapted to receive corresponding keys 5, 6 secured to the inside of corresponding bores 7, 8 of said shaft sections 1 and 2, respectively.

Between the registering end faces 9 and 10 of shaft sections 1 and 2 a ring 11 is adapted to move radially and receives said rod 3 therethrough.

The function of this ring 11 is to constitute the crankpin 12 of the crankshaft assembly. To derive the maximum throw of this crankpin-forming ring 11 with respect to the axis of rotation 13 of power shaft 1, 2, the axis 14 of bores 7 and 8 formed in said shaft sections 1 and 2 is shifted radially by a value $e$ with respect to the axis 13.

As clearly shown in FIG. 2, the ring 11 has a cylindrical outer surface of revolution 16 and an inner cavity 17 of elongated cross-sectional configuration. The width $a$ of this cavity 17 is at least equal to the diameter of said rod 3 and its major dimension $b$ is at least equal to the sum of this diameter of rod 3 and the maximum throw of crankpin 12.

The torque is transmitted from power shaft 1, 2 to ring 11 partly through tenons 18, 19 and complementary slots 20, 21 machined in the transverse or end faces of ring 11 and in the transverse or end faces 9, 10, of power shaft sections 1, 2, respectively. The torque is also transmitted through the rod 3 revolving about the axis 13 of power shaft 1, 2 due to its slight eccentricity $e$.

Of course, the power shaft 1, 2 is properly journaled in the crankcase 22 of the machine utilizing this crankshaft; thus, for example, the necessary guiding action may be obtained by using needle bearings 23, 24.

A variation of the throw value of ring 11 and therefore of crankpin 12 is obtained by providing through this ring 11 a diametral pin 25 extending perpendicularly to the major dimension of tenons 18, 19 and slots 20, 21. This pin 25 is retained in position by a sleeve 26 crimped or otherwise secured to outer surface of ring 11. This pin 25 is fitted in an oblique port 27 formed in rod 3 and extending at a certain angle with respect to the axis of rod 3.

The above-described assembly operates as follows:

In the position illustrated in the drawings the axis of ring merges into the axis of rotation 13 and under these conditions the throw of crankpin 12 is zero. When it is desired to set this crankpin 12 in an eccentric position the rod 3 is pushed axially to the right as seen in FIG. 1. As a consequence of this movement of translation of rod 3 the pin 25 locked against longitudinal movement assumes another position in port 27 and due to the inclination of this seat or port 27 the pin 25 is moved more or less away from the axis 13 of power shaft 1, 2, thus carrying along during its eccentric movement the ring 11 of which the tenons 18, 19, are slidably and radially movable in slots 20, 21.

Since no torque is transmitted through this pin 25, it can slide without any interference in the port 27 during the crankshaft operation.

To control the axial movement of translation of rod 3, the latter comprises at one end an eccentric trunnion 28, with the axis of this trunnion 28 coincident with the axis 13 of power shaft 1, 2 so that a fixed axis in the space is obtained.

This trunnion 28 is held against axial movement but revolves freely within a piston 29. The trunnion 28 is locked in piston 29 by means of a self-aligning bearing 30. The piston 29 is adapted to slide in a cylinder bore 31 formed in a fixed member 32 rigid with the crankcase of the machine utilizing this crankshaft.

What I claim is

1. A variable-throw crankpin crankshaft comprising first and second coaxial shaft sections constituting together a power shaft and each formed with an end face, said first and second sections having first and second bores respectively and formed therein eccentric in relation to the common axis of rotation of said shaft sections, a rod engaging said first and second bores, means for rotatably interlocking said shaft sections while permitting the axial sliding movements of said rod in said first and second bores, a ring disposed between registering end faces of said first and second shaft sections, said ring receiving said rod therethrough, said ring having an inner cavity formed therein for permitting a radial movement of said ring in relation to said rod, said rod having a port formed therethrough and inclined to the rod axis, and a diametral pin rigid with said ring and extending through said port, said ring thus constituting the crankpin of the crankshaft of which the throw can be modified at will by axial movement of said rod.

2. Crankshaft as set forth in claim 1, which comprises in end faces of said ring and in the registering end faces of said shaft sections means permitting rotatably driving said ring about the common axis of said first and second shaft sections, and radially guiding the two ends of said ring in relation to the registering end faces of said first and second shaft sections at right angles to the axis of said diametral pin of said ring.

3. Crankshaft as set forth in claim 1, wherein said ring has a cylindrical outer surface of revolution and an inner cavity of elongated configuration in cross section, the width of said cavity being at a least equal to the diameter of said rod extending therethrough, the major dimension of said elongated cavity being at least equal to the rod diameter plus the value of the maximum throw of said ring.

4. Crankshaft as set forth in claim 1, wherein tenon-and-slot coupling means are provided which extend at right angles to said diametral pin of said ring for coupling the ends of said ring to the end faces of said first and second shaft sections and transmitting the torque.

5. Crankshaft as set forth in claim 1, which comprises a sleeve crimped around said ring to keep the diametral pin of said ring in position.

6. Crankshaft as set froth in claim 1, which comprises at the end of said rod an eccentric trunnion having its axis merged into the common axis of said first and second shaft sections, and an axially movable piston, and means locking said trunnion against translation but free to rotate, whereby axial movement of said piston is attended by an axial movement of said rod and therefore by a modification in the crankpin throw.

* * * * *